United States Patent [19]

Nelson et al.

[11] Patent Number: 5,395,432
[45] Date of Patent: Mar. 7, 1995

[54] SECURITY JET INK

[75] Inventors: Sherry L. Nelson, Schaumburg; Bruce A. Lent, Oak Park, both of Ill.

[73] Assignee: Videojet Systems International, Inc., Wood Dale, Ill.

[21] Appl. No.: 131,690

[22] Filed: Oct. 5, 1993

[51] Int. Cl.⁶ ............................................. C09D 11/00
[52] U.S. Cl. ................................ 106/21 A; 106/21 R; 347/98; 427/145
[58] Field of Search .............. 106/21 R, 21 A; 347/98; 427/145

[56] References Cited

U.S. PATENT DOCUMENTS

| | | | |
|---|---|---|---|
| 3,060,429 | 10/1962 | Winston | 346/1.1 |
| 3,298,030 | 1/1967 | Lewis et al. | 346/75 |
| 3,373,437 | 3/1968 | Sweet et al. | 346/75 |
| 3,416,153 | 12/1968 | Hertz et al. | 346/75 |
| 3,673,601 | 6/1972 | Hertz | 346/75 |
| 4,070,322 | 1/1978 | Hwang et al. | 106/22 C |
| 4,210,566 | 7/1980 | Murray | 106/22 R |
| 4,260,531 | 4/1981 | Wachtel et al. | 524/389 |
| 4,567,213 | 1/1986 | Bhatia et al. | 523/160 |
| 5,087,283 | 2/1992 | Dixon et al. | 106/21 R |

FOREIGN PATENT DOCUMENTS

WO93/11947  6/1993  WIPO .

OTHER PUBLICATIONS

Material Safety Data Sheet, Nocopi Technologies, Inc. No Date Available.

*Primary Examiner*—Helene Klemanski
*Attorney, Agent, or Firm*—Leydig, Voit & Mayer, Ltd.

[57] ABSTRACT

A latent image printing process comprising applying to a substrate a latent image ink composition, with an ink jet printer. Subsequently, the latent image is activated to render it visible, by application of an activator. The present invention also provides a latent ink composition for use in ink jet applications, which is capable of being applied to a white or light colored substrate to form latent printed images that are substantially invisible until activated.

16 Claims, No Drawings

SECURITY JET INK

FIELD OF THE INVENTION

The present invention relates to the field of security printing, in general, as well as to the field of ink jet printing and compositions useful therein.

BACKGROUND OF THE INVENTION

This invention relates to a printing method and system whereby the information printed on a substrate, such as paper, is transferred in the form of a latent image or "secure image" which is invisible to the eye and any other usual image detecting device at the time of printing and is revealed only after the substrate is subjected to a subsequent process of image activation.

Invisible inks have existed for many years. Many such ink systems have been found, developed and used in a limited way mainly because of the limited accessibility of such invisible inks and delivery systems for the latter.

A problem with the use of latent image printing for the purpose of product identification, to date, is that no good means has existed for placing such information on a variety of substrates. Contact printing is not suitable for many such uses as there is no good means to place the image on the desired substrate if it is irregularly shaped or is substantially inaccessible to traditional contact printing devices.

Thus, latent image, variable information such as production date, lot number, batch number, serial number, and the like, cannot presently be placed on many products, except by hand, which is cumbersome, expensive, and prone to inaccuracies, defeating the purpose of using such information.

Ink jet printing and ink compositions which permit ink to be jetted from an ink jet printer have never been used for the purpose of printing latent images, such as variable production information. Ink jet printing is presently employed for printing many types of visible images, using specially formulated inks. Ink jet printing is a well-known technique by which printing is accomplished without contact between the printing device and the substrate on which the printed characters are deposited.

Ink jet printing is a non-impact technique for projecting droplets of ink onto a substrate. There are two major categories of ink jet printing, "Drop-On-Demand" ink jet and "Continuous" ink jet. Using Drop-On-Demand ink jet technology, the ink is normally stored in a reservoir and delivered to a nozzle in the print head of the printer. A means exists to force a single drop of ink out of the nozzle whenever it is needed to print a single spot on the printed medium (for example, paper). For Continuous ink jet, a conducting ink is supplied under pressure to an ink nozzle and forced out through a small orifice, typically 35 to 120 $\mu$m in diameter. Prior to passing out of the nozzle, the pressurized ink stream proceeds through a ceramic crystal which is subjected to an electric current. This current causes a piezoelectric vibration equal to the frequency of the AC electric current. This vibration, in turn, generates the ink droplets from the unbroken ink stream. The ink stream breaks up into a continuous series of drops which are equally spaced and of equal size. Surrounding the jet, at the point where the drops separate from the liquid stream is a charge electrode. A voltage is applied between the charge electrode and the drop stream. When the drops break off from the stream each drop carries a charge proportional to the applied voltage at the instant at which it breaks off. By varying the charge electrode voltages at the same rate as drops are produced it is possible to charge every drop to a predetermined level. The drop stream continues its flight and passes between two deflector plates which are maintained at a constant potential, typically $\pm 2.5$ kV. In the presence of this field, a drop is deflected towards one of the plates by an amount proportional to the charge carried. Drops which are uncharged are undeflected and collected into a gutter to be recycled to the ink nozzle. Those drops which are charged, and hence deflected, impinge on a substrate traveling at a high speed at right angles to the direction of drop deflection. By varying the charge on individual drops, the desired pattern can be printed.

The ink jet process is adaptable to computer control for high speed printing of continuously variable data. Ink jet printing methods can be divided into three general categories: high pressure, low pressure and vacuum techniques. All have been described and employed in conventional ink jet printing and can be employed in the present invention.

Reviews of various aspects of conventional ink jet printing can be found in these publications: Kuhn et al., *Scientific American*, April, 1979, 162–178 and Keeling, *Phys. Technol.*, 12(5), 196–303 (1981). Various ink jet apparatuses are described in U.S. Pat. Nos. 3,060,429, 3,298,030, 3,373,437, 3,416,153 and 3,673,601.

German Pat. Specification No. 3,047,884 discloses the preparation of printed circuit boards employing an ink jet printer. Also disclosed is the spraying of organometallic solutions such as organocopper compounds directly onto an unmetallized circuit board. By means of a subsequent laser beam, the conductor pathways can be cured completely.

Vest et al., Int'l J. *Hybrid Microelectronics*, 6, 261–267 (1983), discloses computer controlled ink jet printing of hybrid microelectronics circuits. An ink jet printer is used with a conductor ink based on metallo-organic compounds in solution. The use of silver neodecanoate as a silver conductor is disclosed, with or without added platinum in the form of platinum amine octoate, to produce a solderable connector. Silver conductor line patterns on glass and alumina substrates were produced, the silver inks decomposed to silver when heated to 250° C.

In general, an ink jet composition must meet certain rigid requirements to be useful in ink jet printing operations. These relate to viscosity, resistivity, solubility, compatibility of components and wettability of the substrate. Further, the ink must be quick-drying and smear resistant, must be capable of passing through the ink jet nozzle without clogging, and must permit rapid cleanup of the machine components with minimum effort.

Thus, ink jet printing has never been successfully used to print latent images.

SUMMARY OF THE INVENTION

In accordance with the present invention there is provided a latent image printing process comprising applying to a substrate a latent image ink composition, with an ink jet printer. Subsequently, the latent image is activated to render it visible, by application of an activator.

The present invention also provides a latent ink composition for use in ink jet applications, which is capable of being applied to a white or light colored substrate to form latent printed images that are substantially invisible until activated.

DETAILED DESCRIPTION OF THE PREFERRED EMBODIMENTS THE GENERAL METHOD

As stated, the present invention provides a latent image printing process comprising applying to a substrate a latent image ink composition, with an ink jet printer. Subsequently, the latent image is activated to render it visible, by application of an activator.

As stated above, invisible ink systems have been used for centuries. As is known, a colorless liquid A is used to form images on a document which thus results in an invisible text. At the receiving end the images formed by the colorless liquid A are revealed or rendered visible by either applying a second or activating liquid B to the paper or, for example, by applying heat depending on the nature of the chemical A.

The present invention can use any one of the known A,B chemical combinations that can act in the manner described above.

In a particularly advantageous embodiment of the invention, it is particularly convenient to utilize the well known combination of any one or a combination of leuco dyes, such as, Copikem-1, otherwise identified as 3,3-Bis(4-dimethylaminophenyl)-6-dimethyl phthalide, from Hilton Davis Co. of Cincinnati, Ohio, Copikem-4, otherwise identified as 2-Anilino-3-methyl-6-diethyl aminofluoran from Hilton Davis, and PSD-150, otherwise identified as 3-Cyclohexyl methyl amino-6-methyl-7-Anilinofluoran from Nippon Soda Co. of Tokyo, Japan, widely used in the carbonless or thermal paper industry, acting as chemical A.

THE LATENT IMAGE INK FORMULATION

The ink compositions of the present invention comprise zinc chloride, $ZnCl_2$, in a suitable carrier. Zinc chloride is employed, in accordance with the present invention, in an ink jet formulation for the first time in the art.

Providing zinc chloride as a latent image forming agent in an ink jet formulation required specific selection of the ink jet formulation components to achieve a product that was essentially invisible upon being applied to a white or light colored substrate, yet had the required properties to be jettable from an ink jet printer, with acceptable print quality.

GENERAL PROPERTIES OF THE INK

In general, the ink compositions of the present invention exhibit the following characteristics for use in ink jet printing systems: (1) a viscosity from about 1.6 to about 7.0 centipoises at 25° C.; (2) an electrical resistivity from about 50 to about 2000 ohm-cm; and (3) a sonic velocity from about 1200 to about 1300 meters/second.

All components of the ink formulation must be selected to assure that any image, when printed, remains invisible, until activated.

THE LATENT IMAGE FORMER

The preferred latent image former is zinc chloride, $ZnCl_2$. Other latent image formers, such as ferric chloride could also be used. For sake of simplicity, zinc chloride will be used throughout the specification as the specific example of a latent image former, but it should be recognized that other latent image formers could be used in place of zinc chloride, such as ferric chloride.

The amount of zinc chloride used in the latent ink formulations of the present invention can vary over a wide range. Thus, the lower limit is set only by the strength or intensity of the image that is desired, once activated. The upper limit is set by the solubility of the zinc chloride in the specific carrier, containing the other components of the formulation. Typically, the amount of zinc chloride present will vary from about 0.5 percent up to about 10 percent, with about 1 to about 5 percent being typical and about 2 to about 4 percent being more preferred. About 3 percent is a contemplated preferred amount.

THE CARRIER

The compositions of the present invention utilize one or more organic carriers. The carrier may comprise both an organic component and, optionally, water.

The organic component may be a ketone or an alcohol, each preferably having no more than ten carbon atoms, or a mixture of both a ketone and an alcohol may be used.

Alcohols which typify those which are useful are methanol and ethanol. If ethanol is employed, it may be used in its normal commercial form, containing a denaturing agent, such as methanol, methyl isobutyl ketone or kerosene Useful ketones in the present invention include aliphatic ketones having no more than ten carbon atoms, in straight or branched chain arrangement, such as acetone, methyl ethyl ketone, methyl isobutyl ketone, or an alicyclic ketone such as cyclopentanone, cyclohexanone, or other alicyclic ketones having up to ten carbon atoms. The preferred organic carrier is a mixture of methyl ethyl ketone, ethanol, and water.

The carrier employed usually is in the range of about 40 percent to about 99 percent, and in the preferred practice is in the range of about 70 percent to about 95 percent.

As indicated, water, optionally, can be used in the formulation. If used, it can be present in an amount from about 0.1 to about 20 percent, typically from about 1 to about 15 percent, and more typically, from about 5 to about 10 percent.

What must be provided is the use of any solvent that does not contain color bodies or is inherently colored, as the printed images would then not remain invisible until activated.

THE BINDER

The ink jet compositions usually also contain a resin binder component such as a vinyl acetate copolymer to improve adhesion between the printed image and the substrate on which the printing is effected. A variety of such resin binders may be employed, as described in U.S. Pat. Nos. 4,210,566, 4,260,531, 4,567,213 and 4,070,322, all of which are incorporated by reference. Useful resin binders include resins that are soluble in the carrier.

Other useful resins would include polyamide resins; polyester resins; acrylics, polymers and copolymers; silicone polymers and copolymers; polyketone resins; hydrocarbon resins; acrylic ester resins; vinyl ester type resins; vinyl caloride polymer and copolymer resins; and hydrocarbon resins.

There is no need for a binder to always be present, especially if adhesion to the substrate is not a problem or when printing on porous substrates. When desired, the binder can be present in an amount from about 1 to about 20 percent, with from about 2 to about 10 percent being more preferred, and an amount from about 3 to about 5 percent being most preferred.

If a binder is not employed, water and/or isopropanol can be used to adjust the viscosity of the formulation.

OPTIONAL COMPONENTS

In addition, other optional additives may be present. Such additives may be any substance that can alter the ink to result in (i) improved solubility of components, (ii) improved print quality, (iii) improved adhesion of the ink to the media, and (iv) improved control of wetting characteristics, which may be related to properties as surface tension and viscosity, among properties.

Conductivity Agents

The compositions of the present invention may contain conductivity agents. If present, they usually are present in amounts of from about 0.2 percent to about 2.0 percent. Examples of suitable conductivity agents include dimethylamine hydrochloride, diethylamine hydrochloride, lithium nitrate, and hydroxylamine hydrochloride. The preferred conductivity agent is lithium nitrate. Care must be taken not to use a conductivity agent that might react with the image former, zinc chloride, to form an insoluble precipitate.

Defoamers

Defoamers are used to improve ink manufacturing and printer performance. Suitable defoamers include acetylenic diols (commercially available as Surfynol 104 from Air Products and Chemicals), petroleum blends (commercially available as Napco NDW, Dehydran C, and Foamaster NS, all from Henkel Corp.), silicone-based defoamers (commercially available as Dow Corning 150 from Dow Corning, and Silwet 1-77, Silwet 720, Silwet 722, and Silwet 7002, all available from Union Carbide) and XRM-3588E, Dee Fo PI-29, and Dee Fo 2020E/50, all available from Ultra Additives. The defoamer, if used, should be present in an amount of from about 0.01 percent to about 0.5 percent by weight of the ink composition, with an amount from about 0.03 to about 0.06 being preferred.

Surfactants

Surfactants may also be used in the ink compositions of the present invention to modify the surface tension of the compositions. If present, they may be present in the ink composition in amounts of from about 0.01 percent to about 0.5 percent. The preferred surfactant is a non-ionic surfactant such as fluorinated alkyl esters like FC-430, a surfactant from 3M. The surfactant may not be needed at all, especially if nonporous surfaces are the intended substrate.

Corrosion Inhibitors

Suitable corrosion inhibitors include from 0.5 percent to 5 percent of an essentially basic, heat-stable, metallo-organic sulphonate compound. The sulphonate compound may be selected from the group consisting of ammonium dinonyl naphthalene sulphonate, basic barium dinonyl naphthalene sulphonate, neutral barium dinonyl naphthalene sulphonate, ethylene diamine dinonyl naphthalene sulphonate, basic barium sulphonate naphthalene sulphonate, overbased sulphurized calcium alkyl phenate, basic calcium sulphonate, overbased calcium sulphonate and highly overbased calcium sulphonate. In addition, suitable corrosion inhibitors may be from 0.1 percent to 5 percent of an alkyl amine. Typical examples of alkylamines are dipropyl amine, diethylamine and dibutyl amine. Again, care must be taken not to use a corrosion inhibitor that might react with the image former, zinc chloride, to form an insoluble precipitate.

Plasticizers

Plasticizers such as pentaerythritol tetrabenzoate, commercially available as Benzoflex S552 (Velsicol Chemical Corporation, Chicago, Ill.), trimethyl citrate, commercially available as Citroflex 1 (Monflex Chemical Company, Greensboro, N.C.), N,N-dimethyl oleamide, commercially available as Halcomid M-18-OL (C. P. Hall Company, Chicago, Ill.), and the like, may be present.

Other Optional Components

The viscosity of the jet ink composition is generally from about 1 to about 10 centipoise, and preferably from about 2 to about 5 centipoise. Various, known viscosity modifying agents may be added, as needed to adjust the viscosity of any given ink formulation.

APPLICATION

The compositions of this invention can be applied to a wide range of porous and non-porous substrates, such as paper, corrugated cardboard and other porous graphic paper products and on non-porous substrates, e.g. coated paper, metal, wood, metals, ceramics, plastics or glass.

After application, the images can be activated to render them visible by use of any of the activators discussed above. The activators can be applied by any suitable means, such as spraying, coating, dipping or the like.

The following examples further illustrate the ink compositions of the present invention, but of course, should not be construed as in any way limiting its scope.

EXAMPLE I

The following composition was formulated:

|  | % |
| --- | --- |
| SDA-3A DENATURED ETHANOL (PETRO PRODUCTS) | 78.2 |
| SK RESIN (HULS AG.)-RESIN BINDER | 4.0 |
| LITHIUM NITRATE-CONDUCTIVE AGENT | 0.5 |
| DEIONIZED WATER | 8.0 |
| BYK 065 (BYK CHEMIE USA)-DEFOAMER | 0.1 |
| PRINTING INK WF-1-94A-(NOCOPI INC.)-SECURITY MATERIAL* | 9.0 |
| FC-430 IN METHYL ETHYL KETONE (3M CO.)-SURFACTANT | 0.2 |
|  | 100.0 |

*67% methyl ethyl ketone, 33% zinc chloride

When the above ink is printed with an ink jet printer, it dries quickly, it appears nearly invisible on the substrate. It can only be visualized by the application of a chemical (such as contained in a marking pen) over the printed message. This will render the message visible or fluorescent (on demand) depending upon the activated material used.

All of the references cited herein are hereby incorporated in their entireties by reference. All references herein to percentages are intended to be percentages, by weight, unless otherwise specified.

While this invention has been described with an emphasis upon certain preferred embodiments, it will be obvious to those of ordinary skill in the art that variations in the preferred composition and method may be used and that it is intended that the invention may be practiced otherwise than as specifically described herein. Accordingly, this invention includes all modifications encompassed within the spirit and scope of the invention as defined by the following claims.

What is claimed is:

1. A latent image ink composition for use in ink jet printing comprising:
   a. zinc chloride as a latent image forming agent; and
   b. a carrier;
   said composition having (1) a viscosity from about 1.6 to about 7.0 centipoises at 25° C.; (2) an electrical resistivity from about 50 to about 2000 ohm-cm; and (3) a sonic velocity from about 1200 to about 1300 meters/second; and
   said composition being substantially invisible when printed upon a white or light colored substrate.

2. The composition of claim 1 further comprising a conductivity agent.

3. The composition according to claim 2, wherein said conductivity agent is selected from the group consisting of lithium nitrate, dimethylamine hydrochloride and hydroxylamine hydrochloride.

4. The composition according to claim 3, wherein said conductivity agent is lithium nitrate.

5. The composition according to claim 1, further comprising a surfactant capable of modifying the surface tension of said ink composition.

6. The composition according to claim 5, wherein said surfactant is a fluorinated alkyl ester.

7. The composition according to claim 1 wherein the carrier is selected from the group consisting of ketones, alcohols, water and mixtures thereof.

8. The composition according to claim 2 wherein the carrier comprises a mixture of methyl ethyl ketone, ethanol, and water.

9. A method of printing a latent image on a substrate, comprising ink jet printing onto said substrate a latent image ink composition, said composition comprising:
   a. zinc chloride as a latent image forming agent; and
   b. a carrier;
   said composition having (1) a viscosity from about 1.6 to about 7.0 centipoises at 25° C.; (2) an electrical resistivity from about 50 to about 2000 ohm-cm; and (3) a sonic velocity from about 1200 to about 1300 meters/second; and
   said composition being substantially invisible when printed upon a white or light colored substrate.

10. The method of claim 9 wherein said ink composition further comprises a conductivity agent.

11. The method according to claim 10, wherein said conductivity agent is selected from the group consisting of lithium nitrate, dimethylamine hydrochloride and hydroxylamine hydrochloride.

12. The method according to claim 11, wherein said conductivity agent is lithium nitrate.

13. The method according to claim 9, wherein said ink composition further comprises a surfactant capable of modifying the surface tension of said ink composition.

14. The method according to claim 13, wherein said surfactant is a fluorinated alkyl ester.

15. The method according to claim 9 wherein the carrier is selected from the group consisting of ketones, alcohols, water and mixtures thereof.

16. The method according to claim 10 wherein the carrier comprises a mixture of methyl ethyl ketone, ethanol, and water.

* * * * *